US009047228B2

(12) United States Patent
Sarferaz et al.

(10) Patent No.: US 9,047,228 B2
(45) Date of Patent: Jun. 2, 2015

(54) SYSTEMS AND METHODS FOR DATA PRIVACY AND DESTRUCTION

(75) Inventors: Siar Sarferaz, Speyer (DE); Joerg Wiederspohn, Heidelberg (DE)

(73) Assignee: SAP SE, Walldorf (DE)

( * ) Notice: Subject to any disclaimer, the term of this patent is extended or adjusted under 35 U.S.C. 154(b) by 21 days.

(21) Appl. No.: 13/558,654

(22) Filed: Jul. 26, 2012

(65) Prior Publication Data

US 2014/0032600 A1 Jan. 30, 2014

(51) Int. Cl.
*G06F 17/30* (2006.01)
*G06F 12/14* (2006.01)

(52) U.S. Cl.
CPC .......... *G06F 12/14* (2013.01); *G06F 17/30091* (2013.01); *G06F 17/30893* (2013.01); *G06F 17/30* (2013.01)

(58) Field of Classification Search
CPC .................... G06F 17/30091; G06F 17/30893; G06F 21/6245
USPC .......................................................... 707/781
See application file for complete search history.

(56) References Cited

U.S. PATENT DOCUMENTS 4,899,299 A * 2/1990 MacPhail .............................. 1/1
5,107,419 A * 4/1992 MacPhail ...................... 707/694
6,073,106 A * 6/2000 Rozen et al. ...................... 705/3
6,275,824 B1 * 8/2001 O'Flaherty et al. .................. 1/1
7,092,944 B2 * 8/2006 Fukuta et al. ......................... 1/1
7,107,416 B2 * 9/2006 Stuart et al. ................... 711/159
7,209,942 B1 * 4/2007 Hori et al. ..................... 709/203
7,680,830 B1 * 3/2010 Ohr et al. ................... 707/999.2
7,721,029 B2 * 5/2010 Lantry et al. .................... 710/74
7,890,530 B2 * 2/2011 Bilger et al. .................. 707/781
8,452,803 B2 * 5/2013 Ghosh ........................... 707/769
8,606,746 B2 * 12/2013 Yeap et al. .................... 707/603
2005/0055518 A1 * 3/2005 Hochberg et al. ............. 711/159
2005/0055519 A1 * 3/2005 Stuart et al. ................... 711/159
2005/0108435 A1 * 5/2005 Nowacki et al. ............. 709/246
2005/0125411 A1 * 6/2005 Kilian et al. ..................... 707/10
2005/0138398 A1 * 6/2005 Hansen ......................... 713/189
2005/0160481 A1 * 7/2005 Todd et al. ...................... 726/30
(Continued)

FOREIGN PATENT DOCUMENTS

WO WO 2013030260 A1 * 3/2013

*Primary Examiner* — Pierre Vital
*Assistant Examiner* — Nargis Sultana
(74) *Attorney, Agent, or Firm* — Buckley, Maschoff & Talwalkar LLC

(57) ABSTRACT

A system and method for managing application(s)' access to personal data of an enterprise business partner is presented. The method includes selecting business partners having personal data records stored in a database connected to an enterprise computing system, for each particular business partner identifying each application that accesses the business partner's personal data records, inquiring from each identified application if it has reached an end-of-purpose period for the personal data records. If an end-of-purpose period has been reached receiving a start-of-retention-time from the application, storing the start-of-retention-time indication in a data record associated with the particular business partner, and blocking access by the particular application to the personal data records of the particular business partner. If a start-of-retention-time indication is not received allowing continued access by the particular application to the personal data records associated with the selected business partner. Applications located in remote systems can be queried and blocked.

15 Claims, 9 Drawing Sheets

(56) References Cited

U.S. PATENT DOCUMENTS

2006/0288210 A1* 12/2006 Hansen .......................... 713/168
2007/0094311 A1* 4/2007 Pelletier et al. ............... 707/204
2007/0266156 A1* 11/2007 Wilkins ........................ 709/225
2009/0070743 A1* 3/2009 Alfors et al. .................. 717/125
2009/0198697 A1* 8/2009 Bilger et al. ...................... 707/9
2010/0185656 A1* 7/2010 Pollard ......................... 707/769
2010/0251329 A1* 9/2010 Wei .................................. 726/1
2011/0287748 A1* 11/2011 Angel et al. ............... 455/414.1
2012/0179823 A1* 7/2012 Hatasaki et al. .............. 709/226
2012/0233129 A1* 9/2012 Brinkmoeller et al. ....... 707/662

* cited by examiner

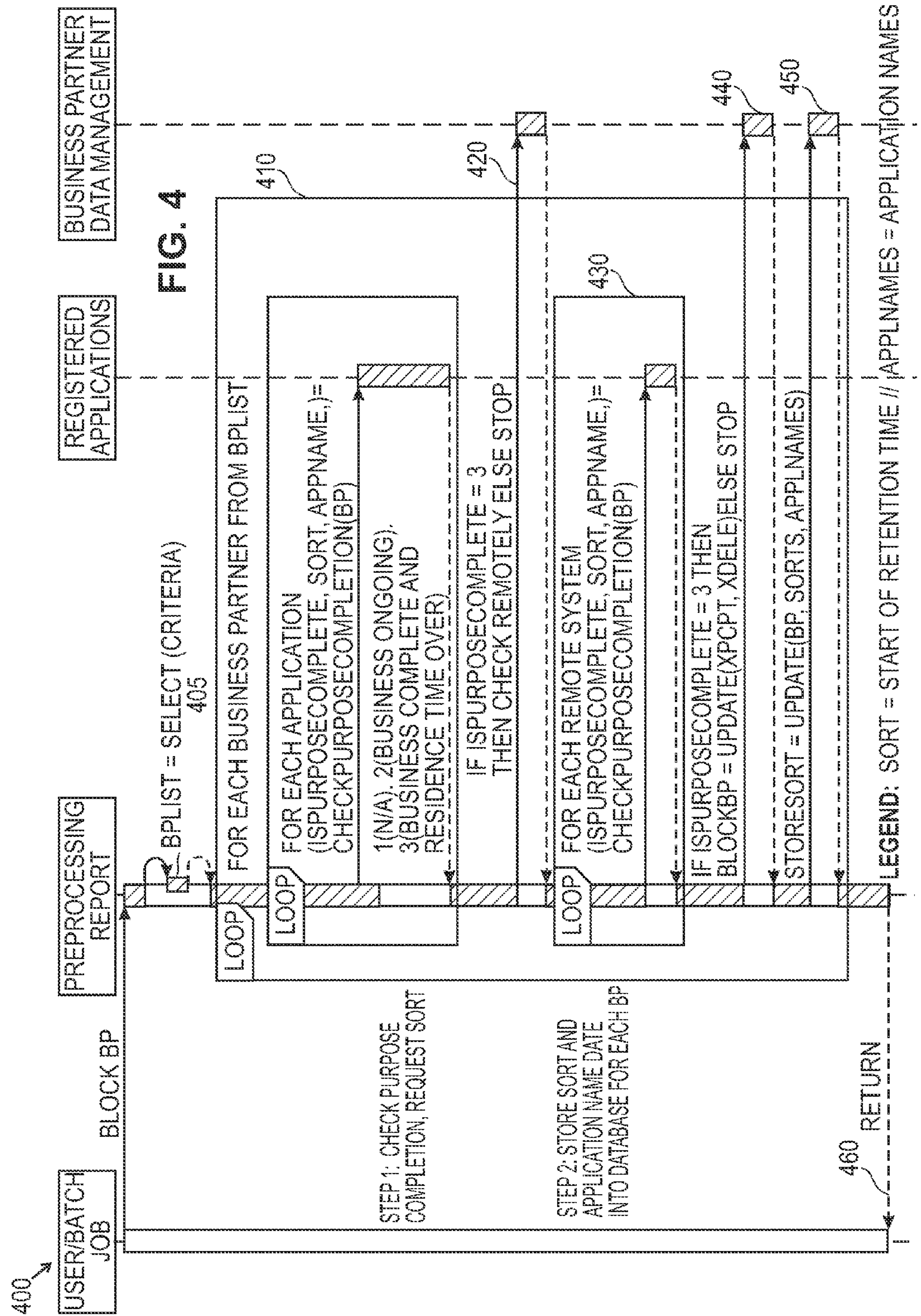

400
USER/BATCH JOB
PREPROCESSING REPORT
REGISTERED APPLICATIONS
BUSINESS PARTNER DATA MANAGEMENT
FIG. 4
BLOCK BP
BPLIST = SELECT (CRITERIA)
405
LOOP
FOR EACH BUSINESS PARTNER FROM BPLIST
410
LOOP
FOR EACH APPLICATION (ISPURPOSECOMPLETE, SORT, APPNAME,)= CHECKPURPOSECOMPLETION(BP)
1(N/A), 2(BUSINESS ONGOING), 3(BUSINESS COMPLETE AND RESIDENCE TIME OVER)
IF ISPURPOSECOMPLETE = 3 THEN CHECK REMOTELY ELSE STOP
420
LOOP
FOR EACH REMOTE SYSTEM (ISPURPOSECOMPLETE, SORT, APPNAME,)= CHECKPURPOSECOMPLETION(BP)
430
IF ISPURPOSECOMPLETE = 3 THEN BLOCKBP = UPDATE(XPCPT, XDELE)ELSE STOP
440
STORESORT = UPDATE(BP, SORTS, APPLNAMES)
450
STEP 1: CHECK PURPOSE COMPLETION, REQUEST SORT
STEP 2: STORE SORT AND APPLICATION NAME DATE INTO DATABASE FOR EACH BP
RETURN
460
LEGEND: SORT = START OF RETENTION TIME // APPLNAMES = APPLICATION NAMES

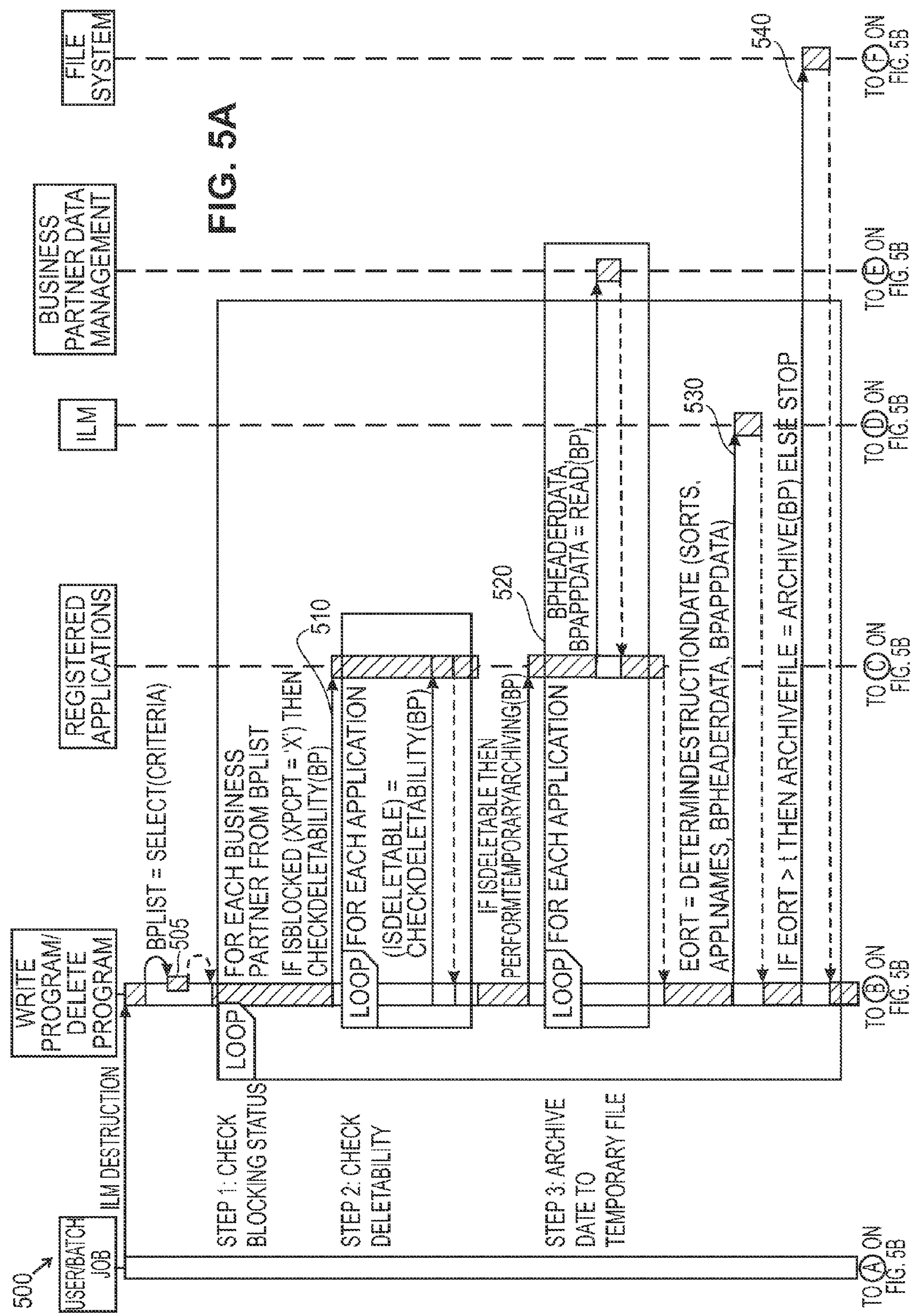

FIG. 5A
500
USER/BATCH JOB
WRITE PROGRAM/ DELETE PROGRAM
REGISTERED APPLICATIONS
ILM
BUSINESS PARTNER DATA MANAGEMENT
FILE SYSTEM
ILM DESTRUCTION
BPLIST = SELECT(CRITERIA)
505
LOOP
FOR EACH BUSINESS PARTNER FROM BPLIST
IF ISBLOCKED (XPCPT = 'X') THEN CHECKDELETABILITY(BP)
510
LOOP
FOR EACH APPLICATION
(ISDELETABLE) = CHECKDELETABILITY(BP)
IF ISDELETABLE THEN PERFORMTEMPORARYARCHIVING(BP)
520
LOOP
FOR EACH APPLICATION
BPHEADERDATA BPAPPDATA = READ(BP)
EORT = DETERMINDESTRUCTIONDATE (SORTS, APPLNAMES, BPHEADERDATA, BPAPPDATA)
530
IF EORT > t THEN ARCHIVEFILE = ARCHIVE(BP) ELSE STOP
540
STEP 1: CHECK BLOCKING STATUS
STEP 2: CHECK DELETABILITY
STEP 3: ARCHIVE DATE TO TEMPORARY FILE
TO A ON FIG. 5B
TO B ON FIG. 5B
TO C ON FIG. 5B
TO D ON FIG. 5B
TO E ON FIG. 5B
TO F ON FIG. 5B

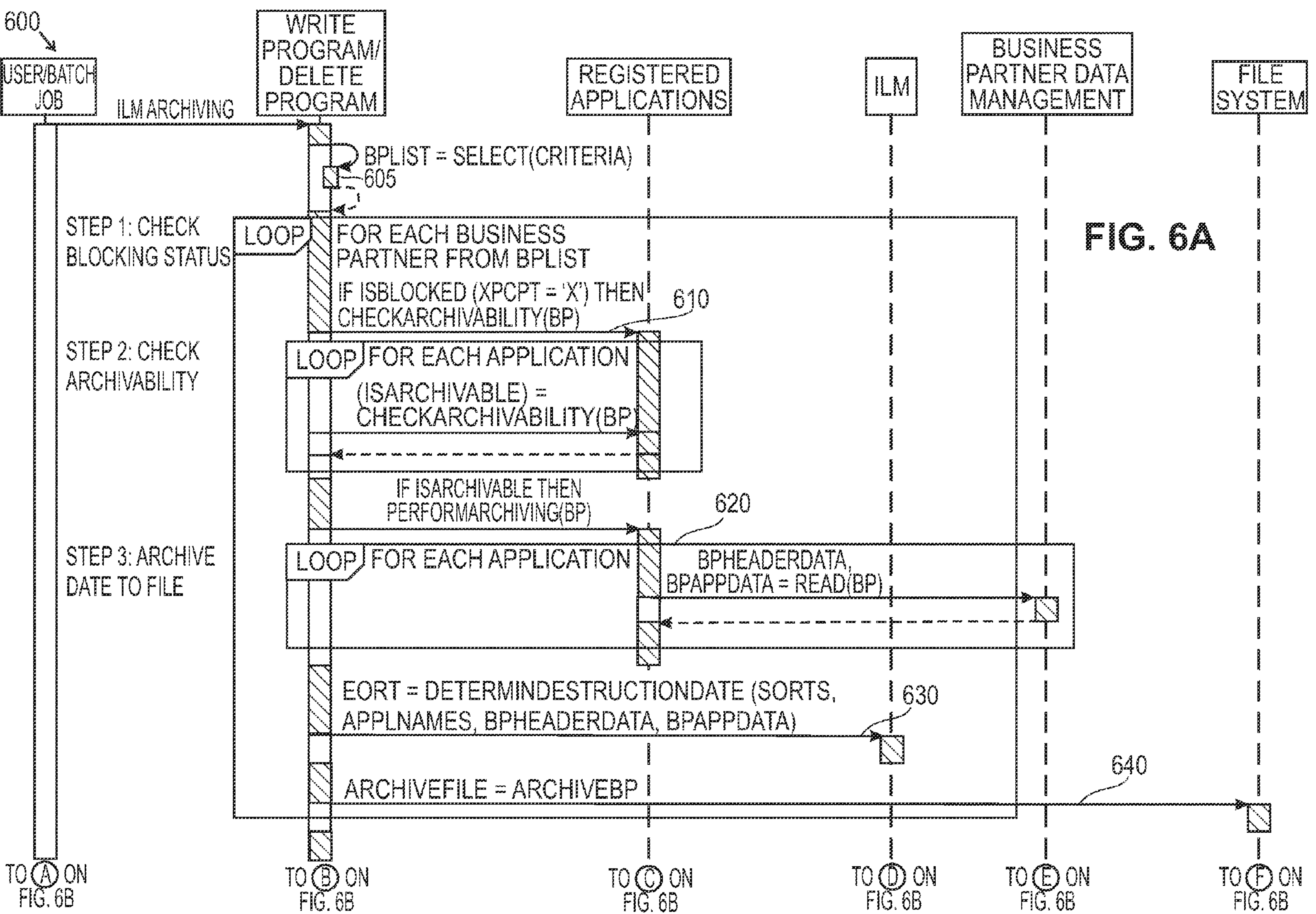
600
USER/BATCH JOB
WRITE PROGRAM/ DELETE PROGRAM
REGISTERED APPLICATIONS
ILM
BUSINESS PARTNER DATA MANAGEMENT
FILE SYSTEM
FIG. 6A
ILM ARCHIVING
BPLIST = SELECT(CRITERIA)
605
STEP 1: CHECK BLOCKING STATUS
LOOP
FOR EACH BUSINESS PARTNER FROM BPLIST
IF ISBLOCKED (XPCPT = 'X') THEN CHECKARCHIVABILITY(BP)
610
STEP 2: CHECK ARCHIVABILITY
LOOP
FOR EACH APPLICATION
(ISARCHIVABLE) = CHECKARCHIVABILITY(BP
IF ISARCHIVABLE THEN PERFORMARCHIVING(BP)
620
STEP 3: ARCHIVE DATE TO FILE
LOOP
FOR EACH APPLICATION
BPHEADERDATA, BPAPPDATA = READ(BP)
EORT = DETERMINDESTRUCTIONDATE (SORTS, APPLNAMES, BPHEADERDATA, BPAPPDATA)
630
ARCHIVEFILE = ARCHIVEBP
640
TO A ON FIG. 6B
TO B ON FIG. 6B
TO C ON FIG. 6B
TO D ON FIG. 6B
TO E ON FIG. 6B
TO F ON FIG. 6B

SYSTEMS AND METHODS FOR DATA PRIVACY AND DESTRUCTION

BACKGROUND

Companies must adhere to data privacy laws for personal data. A core requirement of data privacy is to use personal data only for particular business purposes and to erase them as soon as possible. Often personal data cannot be erased because of regulations regarding legal retention periods. When legal retention periods apply, retained personal data has to be blocked to restrict access to this data. After the retention period, the personal data may be deleted.

To comply with data privacy laws, processes for blocking access to personal data after residence time, and erasure from both a database and any archiving system after retention time must be done. Requirements concerning dependencies between the business partner and the enterprise application components and multi-system aspects must also be followed.

BRIEF DESCRIPTION OF THE DRAWINGS

FIGS. 4 depicts a process in accordance with an embodiment;

FIGS. 5A-5B depict a process in accordance with an embodiment; and

FIGS. 6A-6B depict a process in accordance with an embodiment.

DETAILED DESCRIPTION

Figure 1:
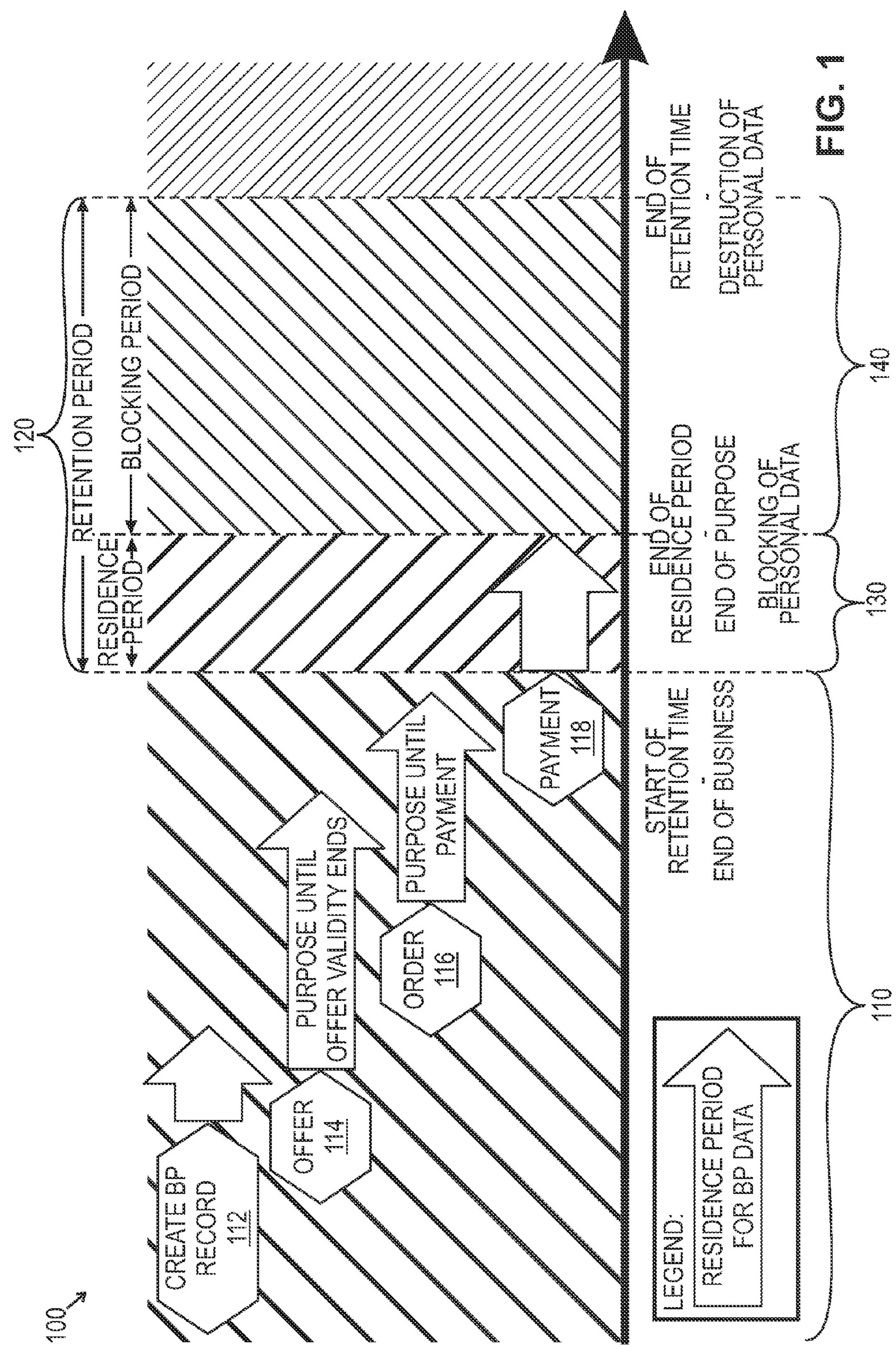
FIG. 1 depicts a timing diagram in accordance with an embodiment.

Presented are systems and methods that implement legal requirements concerning the destruction of personal data on an enterprise computer system landscape. Processes provide for the blocking of business partner records after the elapse of a residence time and for the erasure of business partner records in the enterprise's database and archive after retention time expires.

There can be legal requirements that cause compliant companies to treat personal data with special care. These legal requirements can permit companies to use personal data only for particular business purposes (e.g., order fulfillment) and to erase personal data as soon as it is not required anymore for the particular purpose (e.g., after 2 years when warranty is expired).

However, there can be conflicting regulations between privacy laws and other laws, codes, and/or regulations that a company must follow. For example, in many jurisdictions personal data should not be erased because of regulations in the form of legal retention periods (e.g., keep invoice documents 10 years for audit purposes). When there are conflicting legal retention periods applied to the personal data, embodying systems and methods described below block access to the personal data as the business purpose expires. 'Blocking' means to restrict access to personal data and to prevent personal data to be used on a regular base. Only a few privileged users can have further access—such as data privacy officers or auditors.

An amalgamation of these legal requirements can result in a company's collection and usage of personal data to be within certain boundaries, for example:

1. Companies can store and use personal data only if they need this data to fulfill clear business purposes (e.g., fulfillment of orders or contracts, the consumer has explicitly agreed to receive newsletters, etc.).

2. Strict privacy laws can require a company to erase personal data as soon as there is no longer a need to fulfill a business purpose. Erasure is defined to be the process that makes stored personal data unrecognizable and unreadable. After erasure of personal data it is not possible to identify either the particular person directly or using other data which identifies the particular person. The erasure of personal data with the intention to destroy information is also called destruction or deletion. In the context of data privacy the terms "erasure," "destruction," "destroy," and "deletion" are used as synonymous terms. In compliance with the privacy laws, personal data should be erased if there is no purpose which requires the storage and usage of personal data, or if the storage of personal data is ineligible 3. If erasure is not an option (e.g. due to legal retention period requirements) to be in compliance with privacy laws a company should block personal data until the end of the legal retention period. Blocking means to restrict the access to, and the usage of, stored personal data. To implement compliant blocking, laws and regulations may require that a company:

a) Restrict access to personal data to authorized staff only;

b) Prohibit the processing of personal data after blocking;

c) Allow unblocking of personal data in exceptional cases only.

Against this legal background embodying systems and methods provide a data privacy information lifecycle management tool for enterprises to comply with the various laws and regulations governing the retention of information. Information lifecycle management means managing a company's business data along its entire lifecycle—from the time it is created in the application system, through its long-term storage in a storage system, until its final destruction at the end of its lifecycle.

A business partner (BP) data management component can manage business partner data and relationship data that are relevant in the business process(es) and application(s). Within the system a business partner is represented by software objects representing persons, organizations, or groups of business partners. The business partner data management component can be in communication with a database that stores records associated with the business partners.

These business partner records can include data fields containing names, addresses (e.g., office, home), roles (e.g., contact person, employee, title), personal circumstances (e.g., marital status, custody), role in business process(es) (e.g., prospect, customer, vendor), communication identifiers (e.g., telephone number(s), fax numbers, e-mail address(es)), and perhaps other identifiers that can be used to identify a person. Under the data privacy laws, this information can be viewed as personal data.

FIG. 1 depicts a timing diagram illustrating information lifecycle 100 for business data in accordance with an embodiment. Information lifecycle 100 can include data usage period 110, retention period 120 that can include residence period 130 and blocking period 140. The interrelation of these periods is illustrated in FIG. 1. The data usage period begins with the creation of a BP data record 112 (for example, in the BP data management component). Next an offer 114, or other business purpose, can be extended to the business partner. There can be a valid reason to retain personal data until the business purpose expires. If the offer is accepted and an order 116 is placed, the personal data can still be retained. Once payment 118 is received, the validity of retaining the personal data can expire. As can be seen from FIG. 1, data usage period 110 can begin with the creation of a BP data record and can terminate with when the business purpose is over.

In some situations the data usage period can begin prior to the creation of a BP data record. For example, in advance of starting a marketing campaign a contact list for prospective customers can be procured. There can be a limited time to retain the contact information for a prospect to show interest. Once interest is indicated, a BP record can be created.

Retention period 120 for a business partner data record is the period of time after the data usage period expires through to when that business partner data should be erased from the database or archive. Residence period 130 can be the period of time that elapses before an end-of-purpose date can be determined and the business partner data can be blocked in the database or archived (i.e., the beginning of blocking period 140). During the residence period the business partner data can remain in the database, data can be changed and new business can be created.

FIG. 1 also depicts other information lifecycle events such as start-of-retention time (SoRT) which can begin at the end of data usage period 110, an end-of-purpose time (EoP) which can occur at the expiration of residence period 130, and end-of-retention time (EoRT) which can occur at the end of blocking period 140.

There are dependencies between the BP data record and enterprise applications. Business partner data can be stored in the database associated with business objects such as business partner, sales order, article, contract, purchase order, material, payment, bank account, loan contract etc. The business objects can represent a specific view of well defined and outlined business content. The business objects can be classified for example into master data such as business partner, article or material and transactional application data objects. Business objects can 'use' other business objects. For example a sales order can refer to a business partner as customer, a sales order item can refer to a an article, a bank account can refer to a business partner as an account holder, and a payment order can refer to a receiver account.

When it comes to blocking, archiving, and destruction of expired personal data the dependencies between the business objects and the applications using the records need to be taken into account. For example a business partner object can only be blocked or archived if applications using the object do not need the business partner's record anymore because, by way of example, business activity with the real world business partner is completed and residence period 130 has ended.

Figure 2:
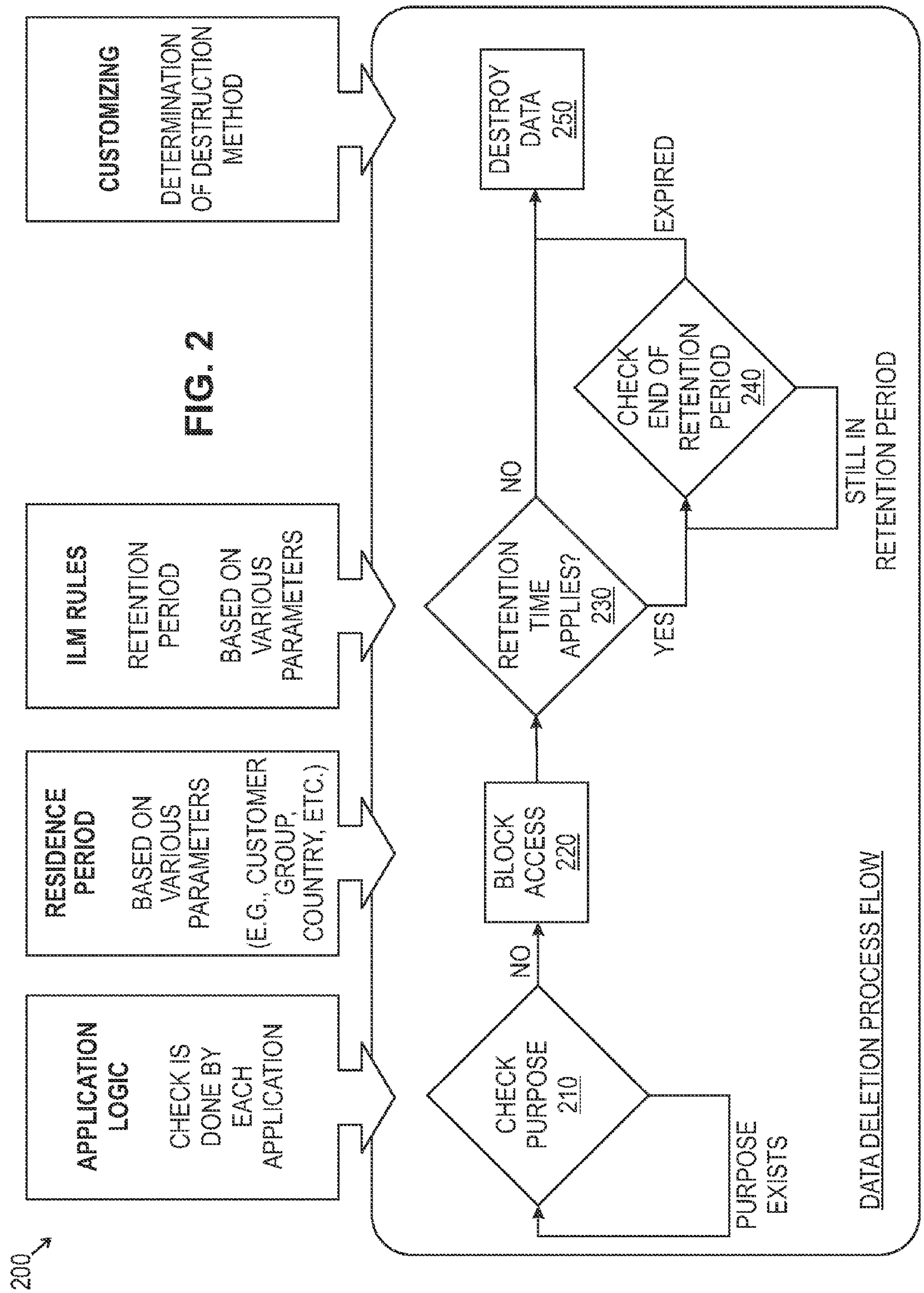
FIG. 2 depicts a process in accordance with an embodiment.

FIG. 2 depicts process 200 for determining access status to personal data in accordance with an embodiment. Process 200 begins during data usage period 110 where a check is made, step 210, to determine if there is still a business purpose for accessing the data. This check can be done by each application, and determination can be based on that application's specific needs to access the personal data. If there is a business purpose, process 200 remains in a loop to continue checking the validity of access.

If there is not a valid business purpose for an application to have access to the personal data, process 200 continues to step 220 where access to the personal data is blocked for at least that application. This block can be determined from various parameters that can be application centric as well as based on jurisdictional requirements or even customer preference. The block can be achieved by setting a business completion flag associated with the BP object or data record. During residence period 130, access to BP records containing privacy data can be provided to general business personnel having a business purpose. During blocking period 140 access to BP records is restricted to authorized personnel such as a corporate data privacy officer or IT staff (should it be necessary to correct access to an incorrectly blocked record).

A check is made to determine if a retention period applies for this data record, step 230. Information lifecycle management rules that are based on various parameters can be utilized to make this determination. If a retention period applies, process 200 continues to step 240, where a loop is entered to check whether the retention period has ended. If the retention period has expired, process 200 proceeds to destroy the data, step 250.

If no retention period is applicable at step 240, process 200 proceeds to destroy the data, step 250. Data destruction can follow predetermined methods that may be customized according to the nature of the data, the application that no longer has a business purpose for this data record, and the nature of the medium on which the data is stored.

Enterprises can setup multiple systems in order to deploy applications that support their business processes. For example a CRM (customer relationship management) instance can be used to support processes in the area of sales & services such as marketing campaigns and new business origination, while an ERP (enterprise resource planning) instance can be used to run sales order execution, materials management and accounting. Specific industries might have use of further applications and systems. In banking, for example, systems can be set up according to lines of business such as account management (cash and savings accounts) or loan management (consumer loans, mortgage loans, business loans).

The various instances running in an enterprise's multi-system landscape can have a need to access the same BP software objects and data records. Under a multi-system landscape scenario business partner data can be synchronized via replication between two systems. This synchronized business partner data can be used by applications deployed in systems 1 and 2. Embodying systems and methods manage the information lifecycle of personal data in multi-system landscapes by taking into account the overlapping data access by the various applications and systems. In accordance with one embodiment, a system landscape that consists only of one system is seen as a specific case covered by the more general case of a multi-system landscape.

Systems and methods in accordance with one or more embodiments can implement algorithms in accordance with one or more of the following data privacy scenarios:

(1) Blocking access to business partner data after residence time—a data manager blocks business partner data after residence time in a way that only a few privileged users can access this data. These privileged users can include an enterprise's data privacy officer or IT personnel.

(2) Unblocking of business partner data blocked by mistake—a data manager unblocks business partner data that has been blocked by mistake after residence time manually.

(3) Erasure of business partner data from database after retention time—a data manager erases business partner data in database after retention time.

(4) Erasure of archived business partner data after retention time—a data manager erases archived business partner data in archive store after retention time.

(5) The cases of items (1)-(4) applied for multi-system landscapes.

Figure 3A:
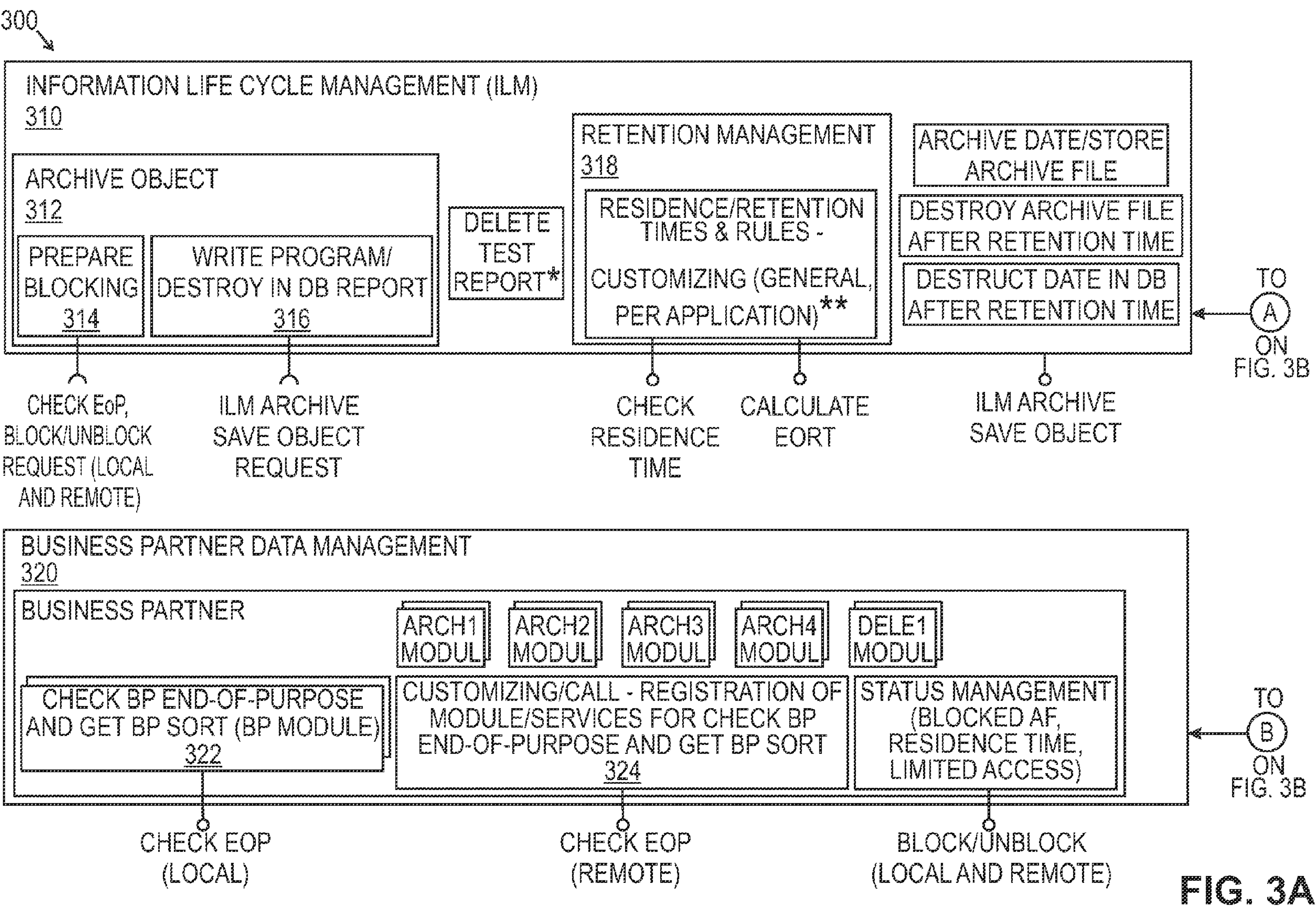
FIGS. 3A-3B depict a system in accordance with an embodiment.
Figure 3B:
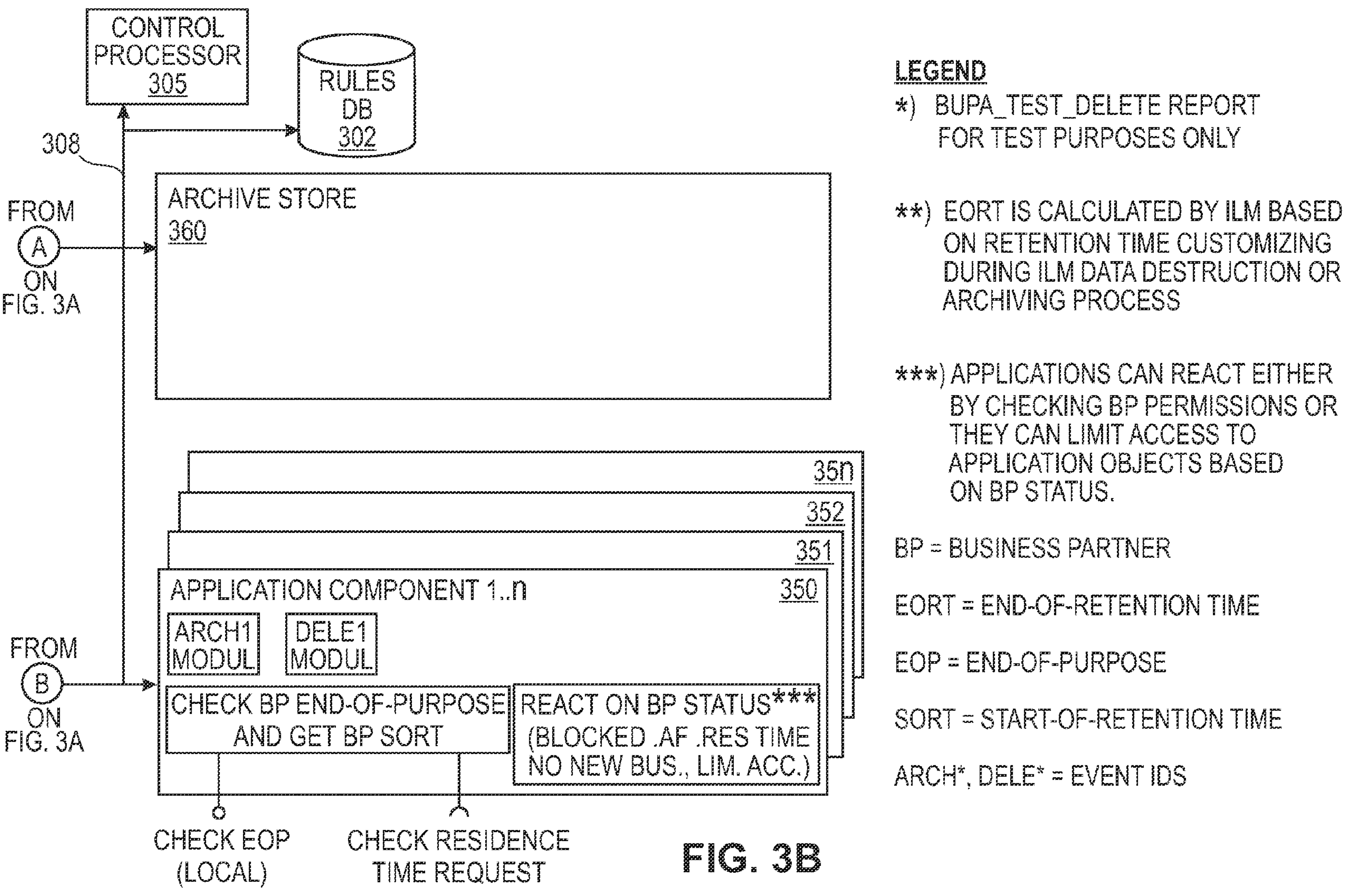

FIGS. 3A-3B depict system 300 for implementing personal data destruction scenarios in accordance with one or more embodiments. System 300 can include central controller, or central processor, unit 305 which can be a processing unit, a field programmable gate array, discrete analog circuitry, digital circuitry, an application specific integrated circuit, a digital signal processor, a reduced instruction set computer processor, etc. Processor unit 305 can interconnect and communicate with other components of system 300 via electronic communication network 308. Processor unit 305 can be located locally with other components of system 300, or can be located remotely, for example as a remote server. Electronic communication network 308 can be the Internet, a local area network, a wide area network, a virtual private network, a wireless area network, or any other suitable configuration of an electronic communication network.

In one embodiment, processor unit 305 can be located within the same computing device (e.g. personal computer, notebook computer, server computer, mainframe computer, terminal, thin client, networked computer, handheld computer, personal digital assistant, tablet computer, workstation, mobile phone, or like device) as other components of system 300. In such an embodiment, processor unit 305 can communicate with other system components within the computing device via an internal bus. Components of the system external to the computing device can be communicated with via the electronic communication network.

System 300 may include internal memory connected to processor unit 305. Internal memory for convenience represents both volatile and non-volatile memory devices. External memory may be connected to processor unit 305 via an input/output (I/O) port. Processor unit 305 may access a computer application program stored in internal memory, or stored in external memory. The computer program application may include code or executable instructions that when executed may instruct or cause processor unit 305 to perform methods discussed herein such as one or methods embodying the personal data retention and destruction scenarios discussed herein. Dedicated hardware, software modules, and/or firmware can implement the components of system 300.

System 300 can include an information lifecycle management (ILM) component 310, a business partner data management component 320, and one or more applications component 350, 351, . . . , 35N. Processor 305, and other components of system 300, can be coupled to one or more archive store(s) 360. Database 302 can contain definitions of the retention rules, residence rules, and rule variants that are based on data privacy requirements. The rule variants can be used to analyze business partner records where the business is conducted in multiple jurisdictions having different data privacy requirements. Rule variants can be applied to relevant business partner records together with the retention rules and residence rules as described below for processes 400, 500, 600 to calculate residence-time-period or retention-time-period. Accordingly, in one embodiment the application or implementation of retention rules and residence rules can include rule variants. In one embodiment, the archive store 360 and database 302 can be implemented in the same physical data store.

ILM component 310 can support the definition and validation of retention and residence rules. Basic processes for archiving and erasure of business objects are provided by the ILM component. Archiving object component 312 can implement processes that archive ILM objects, which can be logical objects of related business data that are relevant for archiving and erasure. Archive object component 312 can include blocking component 314 that can prepare blocking of data by checking for EoP, and reviews block and unblock requests. Archiving object component 312 can include report component 316 that can process an archive/save object request and produce a report on whether data is to be written to archive 360. A report can include whether block and/or unblock requests can be accommodated. Retention management component 318 can implement the customization of residence time and retention time rules for one or more of application components 350, 351, . . . , 35N. The retention management component can calculate whether end-of-residence-time has been reached for personal data or end-of-retention-time (EoRT) has arrived for the blocked data.

Business partner data management component 320 can support status management of personal data and relationship data for one or more business partners. For each BP, an EoP interface component 322 can be provided. The EoP interface component can perform an end-of-purpose check to verify if the EoP has been reached for a particular set of personal data. Business partner data management component 320 can provide a registration customizing component 324 that can be implemented for each BP to create custom interfaces for each application that accesses that particular BP's records in the database (or archive). These customized interfaces account for whether residence time 130 is ongoing or expired for that BP based on the perspective of that particular application's data usage. These customized interfaces can return a start-of-retention-time date (SoRT) for later retention time calculation.

Business partner data management component 320 can also provide archiving and deletion events for the database records associated with the business partner. In the lifecycle of a business partner these events represent different points of time and have the following semantic: ARCH1=Check data for dependencies; ARCH2=Archive business partner header data; ARCH3=Archive business partner dependent data; ARCH4=Delete header and dependent data in database; and DELE1=Check whether business partner can be deleted.

Application component(s) 350, 351, . . . 35N that use business partner data in their processes support and implement business partner data destruction scenarios due to the application's use and dependency on the BP data usage. For example, purchase order or bank account data can depend on business partner. The end-of-purpose check and the determination of start-of-retention-time can be application specific and can vary from application to application. Therefore the end-of-purpose check is customized to be specific for each application components. The checks can address the restriction of access implemented for business partner personal data that has been blocked after residence time. The checks can also implement the archiving and deletion events described above.

Under control of processor 305, the ILM component, the business partner management component, and the application component(s) implement one or more of the five data privacy scenarios listed above.

FIG. 4 depicts process 400 for blocking and unblocking business partner personal data after expiration of residence period 130 in accordance with an embodiment. After the residence time expires business partner personal data is blocked in order to restrict access and to prevent further processing by the application component(s). In some jurisdictions data blocking can be a prerequisite for erasure of personal data if the jurisdiction requires that the data be retained after it has reached the EoP. From technical perspective blocking can be viewed as a first separate processing step to be able to optimize performance, for example by parallel processing.

As an overview, process 400 can accomplish two steps. For a particular business partner, first, an application can check to determine if its data usage period 110 is completed, and if so than can request a SoRT from ILM component 310. Second, the SoRT and an application identifier can be stored in a data record associated with that particular business partner.

The number of business partners in an enterprise system can be very numerous. To improve performance process 400 can group business partners into batch runs, step 405, to determine if an EoP has been reached for applications accessing data records associated with each of the grouped business partners. The blocking process selects business partners according to user specific criteria to form a BPlist, step 405. For each business partner on the BPlist, all registered applications accessing that BP's data records are checked, step 410, for end-of-purpose. This check can return a not applicable (N/A) status, a business ongoing status, or a business purpose complete (end of data usage period 110 and residence period 130) status. Once an application determines that it has reached EoP it returns the start-of-retention-time (SoRT) that can be stored in a data record associated with the business partner. This data record can be in a specific table that contains SoRT for various applications and/or BPs. If the status return is business purpose complete, a check can be made at the business partner data management component, step 420, to identify any remote systems that might be accessing the personal data. If there are remote systems, a check is made of each system (step 430) for any applications accessing the personal data to determine if it has reached the expiration of its data usage period. If both the registered application and the remote applications return that the data usage period has expired a SoRT time is stored, step 440. This SoRT time can be the latest of all returned SoRT times or all returned SoRT times from steps 410 and 420 can be stored. The start-of-retention (SoRT) information is used later by ILM component 310 to calculate an end-of-retention-time (EoRT) for the personal data. The personal data can be blocked at the database by setting a business purpose completion flag in the BP table for the associated personal data.

Blocked personal data of business partners can be unblocked if to correct a mistake or to re-activate a business partner record for business purposes. For unblocking the flag has to be re-set and SoRT information for that personal data is deleted. However these operations should be restricted to authorized persons (e.g., corporate privacy officer, IT personnel) as unblocking is only possible for specific business partner status, and could have legal and business implications.

Figure 5B:
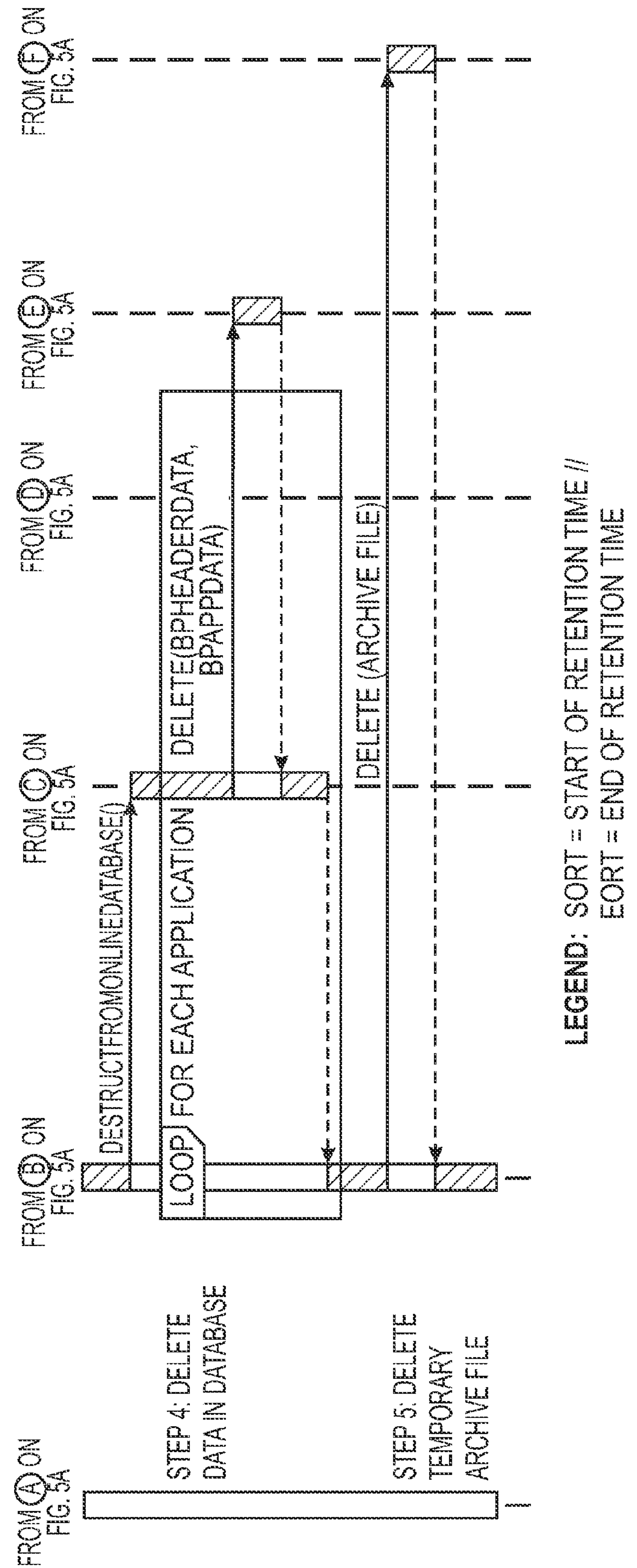

FIGS. 5A-5B depict process 500 for erasure of business partner personal data in a database after the expiration of retention period 120 in accordance with an embodiment. Process 500 begins with the selection, step 510, of a set of business partners that already have personal data access blocked. Because process 500 is directed to personal data that has already been blocked, there is not a need to assure that the EoP time has been reached.

Because dependencies between a business partner data records and other business objects exist, ignoring such referential integrity could result in data inconsistency. Therefore, from the perspective of each registered application a check is performed, step 510, to determine whether the business partner data record can be deleted without impacting an application—e.g., not violating referential integrity. After completion of step 510, for each deletable data record the header and dependent data are read, step 520. Based on this data and its associated SoRT, the ILM component 310 identifies the relevant retention rules stored in rules database 302 and calculates the end-of-retention-time (EoRT), step 530. If the ILM component determines that the retention time is over then that business partner data record can be erased from the database. The ILM component creates a temporary archive file, step 540, which will be deleted after the business partner data records have been erased from the database.

Figure 6B:
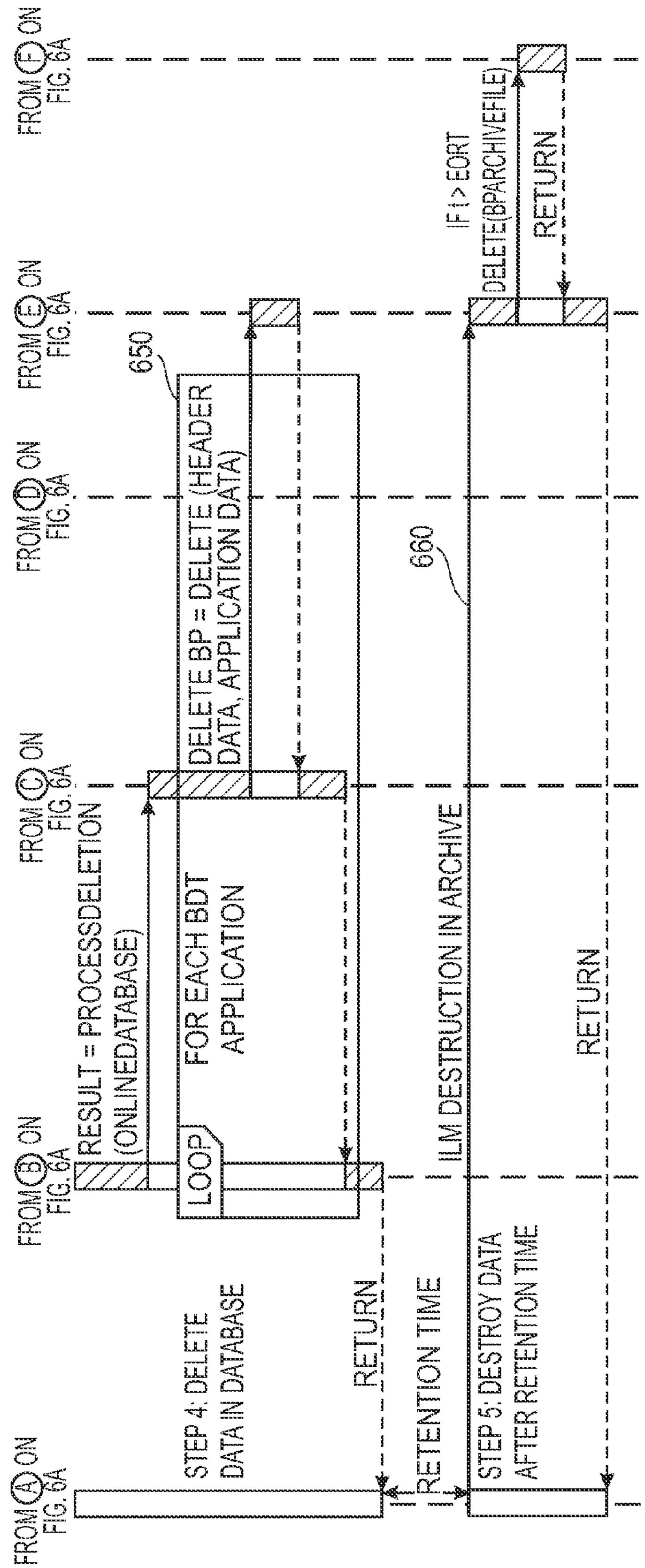

FIGS. 6A-6B depict process 600 for erasure of business partner personal data from the archive after expiration of the retention time in accordance with an embodiment. Process 600 is directed to blocked business partner personal data. For performance reasons related to enterprise systems, a set of blocked business partners is chosen, step 605, according to selection criteria. Because dependencies between business partner data records and other business objects exist, ignoring such referential integrity could result in data inconsistency. Therefore, from the perspective of each registered application a check is performed, step 610, to determine whether the business partner data record can be archived without impacting an application—e.g., not violating referential integrity. Once these checks are successfully performed header and dependent data of the business partner is read, step 620. Based on this data and an associated SoRT, the ILM component 310 can identify the relevant retention rules stored in rules database 302 and calculate the end-of-retention-time (EoRT), step 630. The data including EoRT can be written to an archive file that is transferred to the archive file system data store, step 640. The now-archived data can be deleted from the database, step 650. After the retention period for an archived file is over, it is deleted from the archive system by the ILM component, step 660.

Processes 500 and 600 each result in the destruction of personal data after retention time. Process 500 destroys data in the database, and process 600 destroys personal data in the archive file system.

An enterprise that does not archive data to an archive file system retains personal data in its database until the end of the data's retention period. Process 500 implements a procedure for the destruction of the data from the database. Data destruction under process 500 can create a temporary (archive) file. Personal data that can be destroyed after its retention time expires can be written to this temporary file. The content of the temporary file is then deleted from the database. After the data is deleted, the temporary file itself is deleted. Process 500 ensures data consistency by reuse of an archiving process.

Larger enterprises (e.g., utilities, telecom providers, banks) can decide to archive personal data to minimize the load on its database facilities. The decision to archive could be based on the number of records, data growth rate, effort to setup and run an archive, etc. Personal data can be retained in the archive (and perhaps the database) until the expiration of the data's retention period expires. When data is archived, personal data can be written to an archive file(s) and the data can be deleted from the database when the archive file(s) is stored in the archive file system data store. The archive files (and any personal data remaining in the database) are destroyed (e.g., deleted) after the retention time expiration.

Process 600 destroys archived files containing personal data (including EoRT) that was written to an archive file system data store. The archive file is transferred to the archive file system data store and deleted by ILM 310 when the EoRT is reached and retention time is over.

In accordance with an embodiment, systems and methods support data destruction scenarios in a multi-system landscape. Business partner data can be maintained in the business partner master system and replicated to client systems. Business partner data cannot be erased in the master system even though all the applications residing in the master system have no business purpose until a check is made of the client systems. This is because client systems might still have ongoing business purpose for the business partner data record. If this multi-system dependency is not addressed before erasing business partner data records, data inconsistencies can result in the system landscape. Prior to erasure of a business partner data record in a multi-system landscape, a check is done to ensure that the data usage purpose is completed in master and client systems.

For multi-system use cases it is a well proven architecture principle to do as much as possible locally and as little as necessary landscape-wide. Applying this principle the end-of-purpose check and blocking of expired business partners is performed landscape-wide while erasure in data base respectively archiving and erasure in archive after retention time is processed locally.

Blocking business partner data in a multi-system landscape can be performed at the master system. For a set of selected business partners, the end-of-purpose is checked first locally in the master system. If there is no longer a data usage purpose then client systems can be remotely checked for end-of-purpose. If there is no longer a landscape-wide data usage purpose, then the business partner personal data can be blocked at the master system. This change to the personal data status can be replicated to the client systems in order to block the business partner personal data landscape-wide. For calculation of retention time, the start-of-retention-time (SoRT) can be stored in a business partner specific table in the master and client systems. Landscape-wide blocked business partner master and client systems can independently perform erasure in database and archiving. Unblocking in multi-system landscape could be possible for specific business partner status, but should be considered very carefully.

In accordance with an embodiment, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for implementing personal data retention and destruction scenarios as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for managing access to personal data, the method comprising:

a processor selecting one or more business partners having personal data records stored in a database connected to an enterprise computing system, the personal data records including the personal data;

for each particular business partner of the selected business partners, a business partner data management component of the processor identifying each application that accesses the personal data records associated with the particular business partner;

the business partner data management component inquiring from each identified application if it has reached an end-of-purpose period for the personal data records of the particular business partner;

if an end-of-purpose period has been reached by a particular application, receiving a start-of-retention-time indication from the particular application;

storing the start-of-retention-time indication in a data record associated with the particular business partner;

blocking access by the particular application to the personal data records of the particular business partner based on the start-of-retention-time indication received from the particular application, without deleting the personal data from the database;

if a start-of-retention-time indication is not received from the particular application, allowing continued access by the particular application to the personal data records associated with the selected business partner;

for each particular business partner if a start-of-retention time is received from each application accessing the personal data records associated with the particular business partner, calculating an end-of-retention period time for the personal data by the information lifecycle management component; and removing the personal data from the personal data records at the end-of-retention period expiration.

2. The method of claim 1, further including blocking access by setting a flag in a field of the personal data records of the particular business partner.

3. The method of claim 1, further including the application requesting an end-of-residence-time from an information lifecycle management component of the processor to determine a business purpose status of the personal data records of the particular business partner.

4. The method of claim 1 further including storing the start-of-retention-time and an application identifier in a data table associated with the particular business partner.

5. The method of claim 1, wherein the one or more business partners are selected based on user specified criteria.

6. The method of claim 1, further including:

the business partner data management component identifying one or more remote systems having applications accessing the personal data records associated with the selected business partners;

determining if the applications of the remote systems have reached an end-of-purpose period for the personal data records associated with the selected business partners; and if the applications of the remote systems have reached the end-of-purpose period, receiving a start-of-retention time from applications of the remote system.

7. A non-transitory computer readable medium having stored thereon instructions which when executed by a processor cause the processor to perform the method of:

selecting one or more business partners having personal data records stored in a database connected to an enterprise computing system, the personal data records including personal data;

for each particular business partner of the selected business partners, a business partner data management component of the processor identifying each application that accesses the personal data records associated with the particular business partner;

the business partner data management component inquiring from each identified application if it has reached an end-of-purpose period for the personal data records of the particular business partner;

if an end-of-purpose period has been reached by a particular application, receiving a start-of-retention-time indication from the particular application;

storing the start-of-retention-time indication in a data record associated with the personal data records of the particular business partner;

blocking access by the particular application to the personal data records of the particular business partner based on the start-of-retention-time indication received from the particular application, without deleting the personal data from the database;

if a start-of-retention-time indication is not received from the particular application, allowing continued access by the particular application to the personal data records associated with the selected business partner;

for each particular business partner if a start-of-retention time is received from each application accessing the personal data records associated with the particular business partner, calculating an end-of-retention period time for the personal data by the information lifecycle management component; and removing the personal data from the personal data records at the end-of-retention period expiration.

8. The non-transitory computer readable medium of claim 7, further including executable instructions to cause a processor to perform the step of storing the start-of-retention-time and an application identifier in a data table associated with the particular business partner.

9. The non-transitory computer readable medium of claim 7, further including executable instructions to cause a processor to perform the steps of:

the business partner data management component identifying one or more remote systems having applications accessing the personal data records associated with the selected business partners;

determining if the applications of the remote systems have reached an end-of-purpose period for the personal data records associated with the selected business partners; and if the applications of the remote systems have reached the end-of-purpose period, receiving a start-of-retention time from applications of the remote system.

10. A system comprising:

a processor in communication with a database connected to an enterprise computing system;

the database containing personal data records associated with business partners of the enterprise, the personal data records including personal data;

the enterprise computing system including one or more applications that access the personal data records;

the processor including a business partner data management component configured to identify each application that accesses the personal data records associated with a particular business partner of the selected business partners;

the processor including an information lifecycle management component that is configured to store a start-of-retention-time indication received from a particular one of the identified applications;

the processor configured to block the particular application access to the personal data records associated with the particular business partner based on the start-of-retention-time indication received from the particular application, without deleting the personal data from the database;

the information lifecycle management component configured to calculate an end-of-retention period time for the personal data for each particular business partner if a start-of-retention time is received from each application accessing the personal data records associated with the particular business partner; and the processor configured to remove the personal data from the personal data records at the end-of-retention period expiration.

11. The system of claim 10, further including a data store in communication with the processor, the data store containing at least one of retention rules and residence rules based on data privacy requirements.

12. The system of claim 11, further including the information lifecycle management component configured to support the definition of the retention rules and the residence rules.

13. The system of claim 10, the information lifecycle component including:

an archiving component configured to archive information lifecycle management objects;

a blocking component configured to block access to the personal data records; and a retention management component configured to customize at least one of the residence rules and the retention rules associated with the one or more applications.

14. The system of claim 10, the business partner data management component including:

an end-of-purpose interface component configured to perform verification of an application reaching its end of purpose for personal data records associated with a particular one of the selected business partners; and a registration component configured to create custom interfaces between each particular business partner and each application accessing the personal data records of the particular business partner.

15. The system of claim 14, further including:

one or more archiving event modules configured to implement at least one of check data for dependencies, archive business partner record header data, archive business partner dependent data, and delete one of header and dependent data; and one or more deletion event modules configured to determine if a business partner data record can be deleted.

* * * * *